2 Sheets—Sheet 1.
W. H. PARLIN.
Sulky-Plow.
No. 199,930. Patented Feb. 5, 1878.
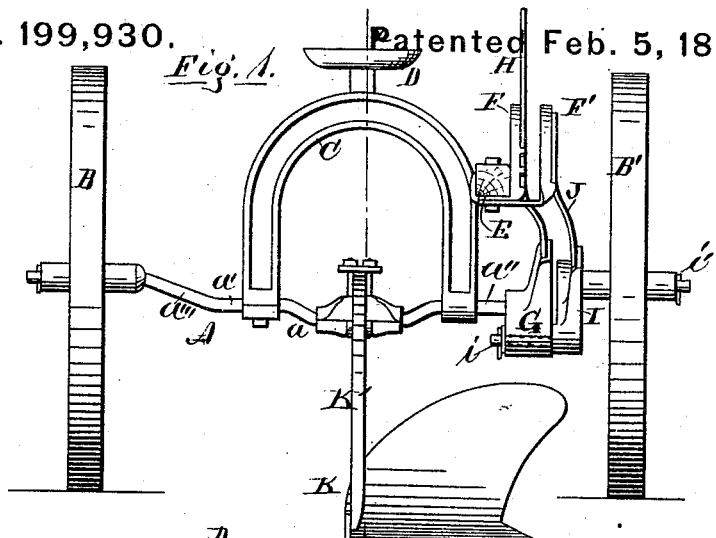
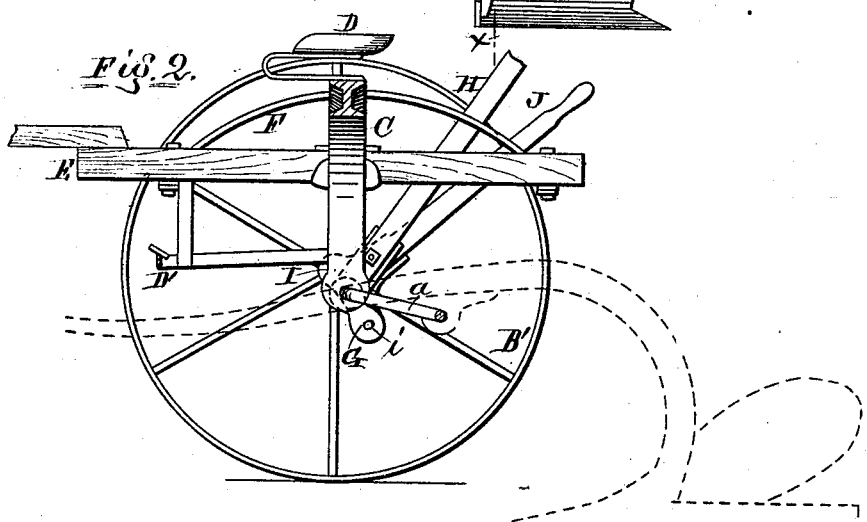
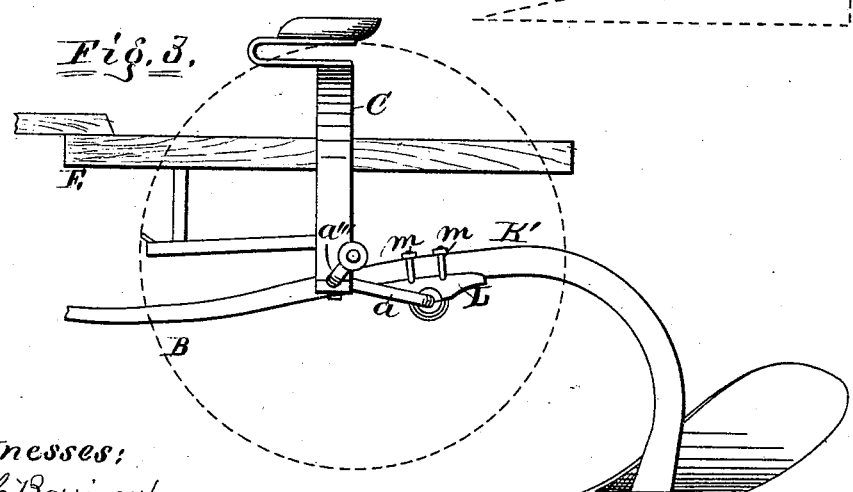
Witnesses:
W. H. Barringer.
P. R. Richards.
Inventor.
William H. Parlin
By W. B. Richards,
atty.

W. H. PARLIN.
Sulky-Plow.
No. 199,930. Patented Feb. 5, 1878.
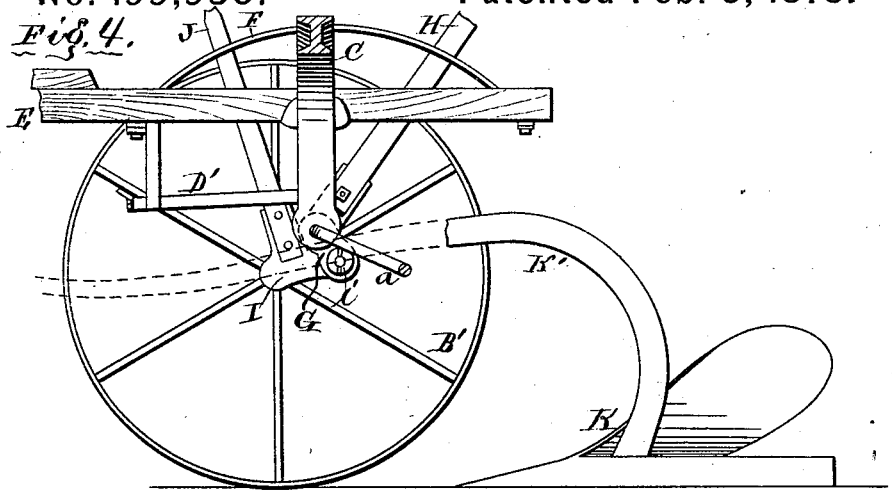
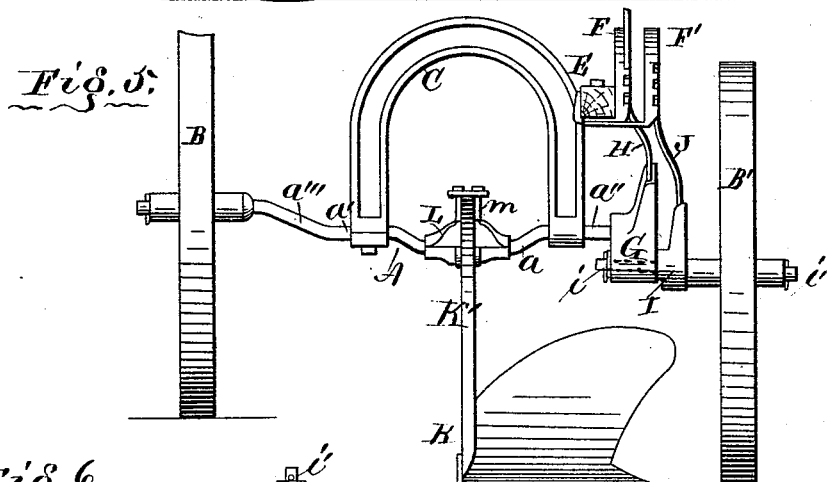
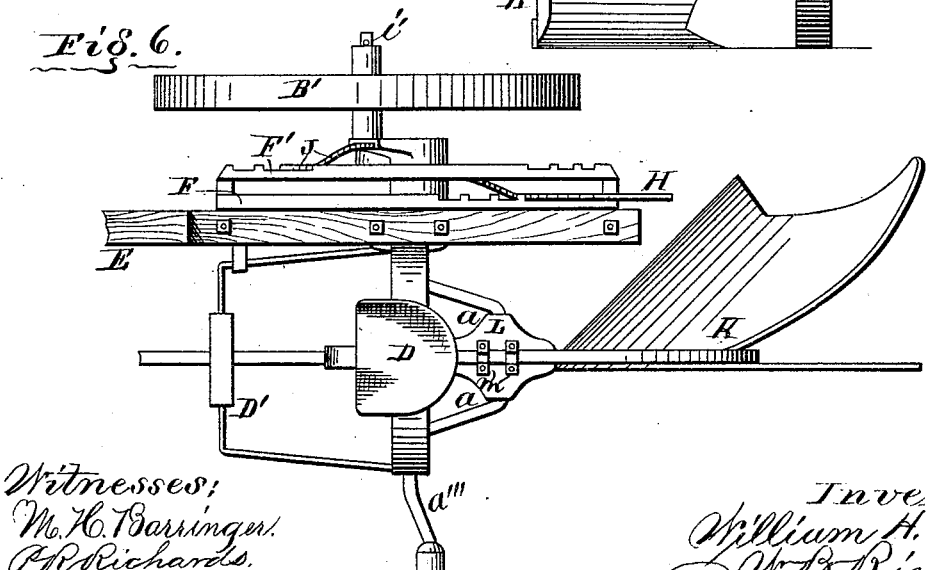
Witnesses:
M. H. Barringer.
P. R. Richards.
Inventor:
William H. Parlin,
By W. B. Richards,
Atty.

UNITED STATES PATENT OFFICE.

WILLIAM H. PARLIN, OF CANTON, ILLINOIS, ASSIGNOR TO PARLIN & ORENDORFF, OF SAME PLACE.

IMPROVEMENT IN SULKY-PLOWS.

Specification forming part of Letters Patent No. 199,930, dated February 5, 1878; application filed October 12, 1877.

*To all whom it may concern:*

Be it known that I, WILLIAM H. PARLIN, of Canton, in the county of Fulton and State of Illinois, have invented certain new and useful Improvements in Sulky-Plows; and I do hereby declare that the following is a full, clear, and exact description of my invention, which will enable others skilled in the art to which it appertains to make and use the same, reference being had to the accompanying drawings, and to the letters of reference marked thereon, which form a part of this specification.

This invention relates to sulky-plows of that class having an axle with a central crank part, to which the plow-beam is attached, and which supports an arch on which the driver's seat and tongue and other operating parts are fixed; and the invention consists, first, in forming a crank end on the end of the axle which carries the land-side wheel, curved or bent at such an angle to the central crank part that the weight of the driver and frame may be utilized in raising the plow from the bottom of the furrow; second, in fixing upon the end of the axle next the furrow-wheel a crank, with an attached lever for rotating the axle to raise and lower the plow, to the outer end of which crank is journaled a second crank, carrying the furrow-wheel and a lever for raising and lowering said wheel, either of which cranks may be fixed in position by its respective lever, and when either is fixed in position the other may be operated upon the common fulcrum or journal which connects them.

The invention further consists in fixing the crank which is attached to the end of the main axle on the furrow-wheel side of the plow, in such relative position to the main axle as will utilize the weight of the driver and frame in rotating said crank upon its fulcrum or journal to the outer crank, to raise the plow from the furrow when in operation, all as hereinafter fully described.

In the accompanying drawings, Figure 1 is a rear elevation of a plow embodying my invention, the parts in position for backing furrows and opening dead furrows. Fig. 2 is a sectional view in the line *x x* in Fig. 1. Fig. 3 is a side elevation, the parts in the same positions as at Fig. 1. Fig. 4 is a sectional view in the line *x x* in Fig. 1, the positions of parts changed for ordinary plowing. Fig. 5 is a rear elevation of Fig. 4. Fig. 6 is a top or plan view.

Referring to the parts by letters, A represents the main axle, consisting of a central double-crank portion, *a*, horizontal portions *a' a''*, and a crank portion, *a'''*, at one end. The crank *a'''* is bent or formed so as to stand obliquely to the double crank *a*, as shown more plainly at Fig. 3, for purposes hereinafter described, and has the land-side wheel B journaled on its outer end. C is an elevated arch, journaled at its ends, and supported on the parts *a' a''* of the axle, and has fixed upon it the driver's seat D, foot-rest D', and guide-pole or tongue E. Attached to the tongue E are two segmental parallel rack-bars, F F'. G is a crank attached to the end *a''* of the axle, and extends therefrom radially in such relation to the radial extension of the crank *a* as shown plainly at Fig. 4. H is a hand-lever attached to the boss of the crank G, and extends upward to the rack-bar F. I is a crank, journaled at *i* at one end to the distal or free end of the crank G, and its other end having a spindle, *i'*, on which the furrow-wheel B' is journaled. J is a lever extending from the crank I to the rack-bar F'. K is the plow, the beam K' of which is connected to the crank *a* of the axle by a saddle, L, journaled on the crank *a*, and secured to the beam K and axle by stirrups *m*.

In describing the operation it may be remarked, first, that the crank G may be oscillated on the journal *i* as a fulcrum, for the purpose of rotating the axle A to raise and lower the plow relatively to the wheels B B', and the crank I may be oscillated on the same fulcrum to raise and lower the furrow-wheel relatively to the other parts of the machine; and that while either crank is rotated or oscillated upon the other as a fulcrum, the fulcrum-crank for the time may be locked or fixed in position by its respective hand-lever and segment-bar. Figs. 1 and 2 show the positions of the levers and cranks for retaining the wheels B B' in the same horizontal plane and the plow at a lower plane for opening dead furrows, making backing furrows, &c. While the parts are in the last-described position the throwing of the lever J forward and engaging it with a notch in the forward end of segment-bar F' will turn the crank I downward, and hold the furrow-wheel B' in the same horizontal plane as the plow for ordinary plowing, as shown at Figs. 4 and 5. While the levers H and J are in the positions shown at Figs. 1 and 2, or 4 and 5, the lever H may be thrown forward and engaged with its rack-bar F, to elevate and hold in an elevated position the plow K, as shown by dotted lines at Fig. 4. By reference to Fig. 4 it will be seen that the crank G, in turning forward to elevate the plow, rotates on the fixed fulcrum $i$, and the end $a''$ of the axle is above and forward of said fulcrum, so that the weight of the driver and arch C rests upon the upward forward end of the crank G, and aids in rotating it to raise the weight of the plow and the superincumbent furrow-slice when in operation in the field. Reference to Fig. 3 will also illustrate the same effect resulting from the radial position of the crank $a'''$ on the axle in relation to the radial position of the crank $a$.

Having thus described my invention, I claim as new and desire to secure by Letters Patent—

1. In a sulky-plow, an axle, A, having a double crank, $a$, to which the plow is attached, and a crank, $a'''$, carrying the land-side wheel, said crank diverging obliquely from the wheel-spindle, as shown and described, whereby the weight of the driver and frame is utilized in raising the plow from the ground, substantially as and for the purpose specified.

2. The axle A, having central double crank $a$, to which the plow is attached, the oblique crank $a'''$ at one end, and a fixed crank, G, upon the other end, to which a crank, I, is journaled, and on which the furrow-wheel B' is carried, substantially as and for the purpose specified.

3. The crank-axle A, constructed as described, and combined with the cranks G and I, levers H and J, rack-bars F F', arch C, plow K, and wheels B B', substantially as described, and for the purpose specified.

4. The axle A, having double crank $a$ and crank G in the relative radial positions described, arranged to operate with the crank I, arch C, and plow K, substantially as described, and for the purpose specified.

In testimony that I claim the foregoing as my own I affix my signature hereto in presence of two witnesses.

WILLIAM H. PARLIN.

Witnesses:
WILLIAM J. ORENDORFF,
D. BEESON.